(12) United States Patent
Luccato

(10) Patent No.: US 8,901,839 B2
(45) Date of Patent: Dec. 2, 2014

(54) TWO-SWITCH FLYBACK POWER SUPPLY DEVICE

(75) Inventor: Daniele Luccato, Vittorio Veneto (IT)

(73) Assignee: Osram AG, Munich (DE)

( * ) Notice: Subject to any disclaimer, the term of this patent is extended or adjusted under 35 U.S.C. 154(b) by 125 days.

(21) Appl. No.: 13/346,843

(22) Filed: Jan. 10, 2012

(65) Prior Publication Data

US 2012/0176060 A1    Jul. 12, 2012

(30) Foreign Application Priority Data

Jan. 11, 2011    (IT) ................................ TO2011A0005

(51) Int. Cl.
*H05B 37/02* (2006.01)
*H02M 3/335* (2006.01)

(52) U.S. Cl.
CPC ..................... *H02M 3/335* (2013.01)
USPC ........ 315/221; 315/209 R; 315/212; 315/216; 315/219; 363/133; 363/134

(58) Field of Classification Search
USPC ............... 363/16, 20, 22, 24, 26, 65, 71, 133, 363/134; 315/209 R, 212, 216, 219, 221
See application file for complete search history.

(56) References Cited

U.S. PATENT DOCUMENTS

| | | | | |
|---|---|---|---|---|
| 4,016,475 | A | | 4/1977 | Makino |
| 4,685,039 | A | * | 8/1987 | Inou et al. ........................ 363/16 |
| 5,068,776 | A | * | 11/1991 | Polivka ............................ 363/17 |
| 6,069,798 | A | * | 5/2000 | Liu ................................... 363/16 |
| 2008/0315858 | A1 | * | 12/2008 | Hong et al. .................... 323/351 |

FOREIGN PATENT DOCUMENTS

| | | |
|---|---|---|
| CN | 85106335 A | 2/1987 |
| DE | 2551772 A1 | 5/1976 |
| JP | 60106363 A | 6/1985 |
| JP | 1103161 A | 4/1989 |
| JP | 6038523 A | 2/1994 |
| JP | 7046840 A | 2/1995 |
| JP | 2002369524 A | 12/2002 |
| JP | 3118458 U | 1/2006 |
| SU | 978293 A1 | 11/1982 |

OTHER PUBLICATIONS

English abstract for JP60106363A.
English abstract for JP6038523A.
English abstract for JP1103161A.
English abstract for JP7046840A.
English language abstract for JP 2002369524 A, dated Dec. 20, 2002.
English language claims and detailed description for JP 3118458 U (undated, see attached Transmittal Letter).

\* cited by examiner

*Primary Examiner* — Douglas W Owens
*Assistant Examiner* — Borna Alaeddini

(57) ABSTRACT

In various embodiments, a two-switch flyback power supply may include a transformer having a primary winding and a secondary winding to feed a load; a pair of electronic switches alternatively switchable on and off to connect the primary winding of said transformer to an input line to feed said primary winding of said transformer, wherein at least one of said electronic switches is an electronic switch having a control electrode floating with respect to ground; a capacitive voltage divider arranged between said input line and the ground of the device, with the dividing point of said capacitive voltage divider connected to an intermediate point of said primary winding of said transformer; and an auxiliary secondary winding in said transformer, said auxiliary secondary winding feeding the control electrode of said at least one of said electronic switches.

6 Claims, 2 Drawing Sheets

TWO-SWITCH FLYBACK POWER SUPPLY DEVICE

CROSS-REFERENCE TO RELATED APPLICATION

This application claims priority to Italian Patent Application Serial No. TO2011A000005, which was filed Jan. 11, 2011, and is incorporated herein by reference in its entirety.

TECHNICAL FIELD

The present disclosure relates to electrical power supply devices.

In various embodiments, the description may refer to power supply devices adapted to be used for light sources, such as LED light sources.

In various embodiments, the description may refer to power supply devices of the so-called "two-switch flyback" type.

BACKGROUND

FIG. 1 schematically shows the basic design of a power supply device of the two-switch flyback type, which can be used for example to supply, from a constant supply voltage Vin, a load L comprising for example a LED light source, such as a so-called LED string.

According to a well-known topology the supply device, denoted on the whole by 10, is built around a transformer T having a primary winding T1 and a secondary winding T2.

Primary winding T1 is connected to voltage Vin on an input line denoted by 12 via two electronic switches 14a, 14b, adapted to be made conductive ("on") and non conductive ("off") in mutual alternation; in other words, when 14a is on, 14b is off and vice versa. In various embodiments, said switches are comprised of mosfets.

Each switch 14a, 14b has associated therewith a respective diode D3, D4, in an arrangement wherein:

switch 14a (called "high" switch) is interposed between the input line 12 and the cathode of diode D4, the anode whereof is coupled to circuit ground, switch 14b (called "low" switch) is interposed between ground and the anode of diode D3, the cathode whereof is connected to input line 12, and both ends of primary winding T1 of transformer T are respectively connected to the intermediate point between high switch 14a and diode D4 and to the intermediate point between diode D3 and low switch 14b.

Secondary winding T2 of the transformer usually includes a rectifying/stabilizing network, which here is schematically depicted as a diode D1 and an output capacitor C, across which a voltage Vout is present which corresponds to the voltage across load L, towards which a current is supplied with intensity $i_{out}$.

The basic arrangement in FIG. 1 meets operation requirements which are well known in the field, so as to make a detailed description unnecessary in the following.

The arrangement of the two-switch flyback converter in FIG. 1 shows, as compared with a single-switch flyback converter, the advantage that the maximum reflected voltage equals the main voltage, which supports a Zero Voltage Switching (ZVS) without applying high voltage to the mosfets.

This is a remarkable advantage, because it makes it possible to use mosfets with lower drain-source voltage values, which are both more efficient and less costly.

The arrangement in FIG. 1 has however a drawback in that the high switch 14a has a gate floating with respect to ground, which may cause driving difficulties and consequently a possible efficiency drop and a lower switching speed.

The inventors have observed that this problem may be solved, at least theoretically, by resorting to auxiliary supply sources connected to the high side of the circuit.

This solution would however involve the provision of a further supply source within the same circuit, with an undesirable addition of components and higher costs, due for example to resorting to a driver that can withstand voltages as high as 500-600 V: such components, albeit available, tend to be rather costly.

These factors are not compatible with the presently considered solutions, which, particularly for consumer market applications, must have a cost and a power absorption as low as possible.

Moreover, the inventors have observed that another possibility could involve the use of a pulse transformer. This would result again in a rather expensive solution, because both the transformer and a driver, adapted to operate with the high currents required by a pulse transformer, would naturally be quite costly, and would limit the use of such a solution to high power applications in professional sectors. Moreover, a solution involving the provision of a pulse transformer would impose restrictions on the duty cycle as well (which cannot be higher than 50%).

SUMMARY

In various embodiments, a two-switch flyback power supply may include a transformer having a primary winding and a secondary winding to feed a load; a pair of electronic switches alternatively switchable on and off to connect the primary winding of said transformer to an input line to feed said primary winding of said transformer, wherein at least one of said electronic switches is an electronic switch having a control electrode floating with respect to ground; a capacitive voltage divider arranged between said input line and the ground of the device, with the dividing point of said capacitive voltage divider connected to an intermediate point of said primary winding of said transformer; and an auxiliary secondary winding in said transformer, said auxiliary secondary winding feeding the control electrode of said at least one of said electronic switches.

BRIEF DESCRIPTION OF THE DRAWINGS

The invention will now be described, by way of non-limiting example only, with reference to the enclosed views, wherein.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Various embodiments propose a solution to the drawbacks of the previously outlined arrangements.

In various embodiments, it is possible to achieve speed performances with are equivalent to much more expensive solutions.

In various embodiments, the possibility to use a two-switch flyback converter in low power applications allows to obtain good efficiency, because for each switching the mosfet must discharge its capacity starting from a voltage level which is lower than in the case of a single switch.

In various embodiments a low number of components can be used; in some embodiments only two capacitors need to be added.

In various embodiments lower leakages are achieved because the arrangement does not require any additional driver, which would need to be supplied and therefore might originate leakages.

Figure 1:
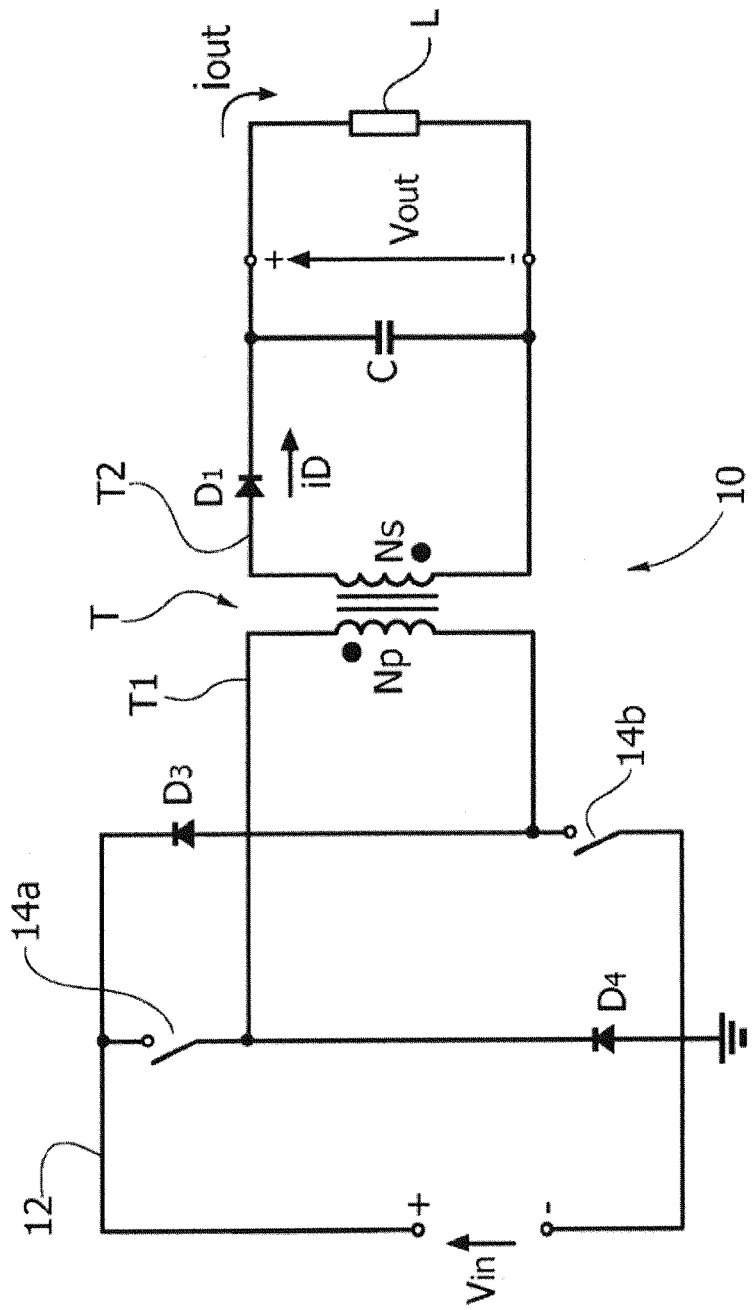
FIG. 1 has already been described in the foregoing.
Figure 2:
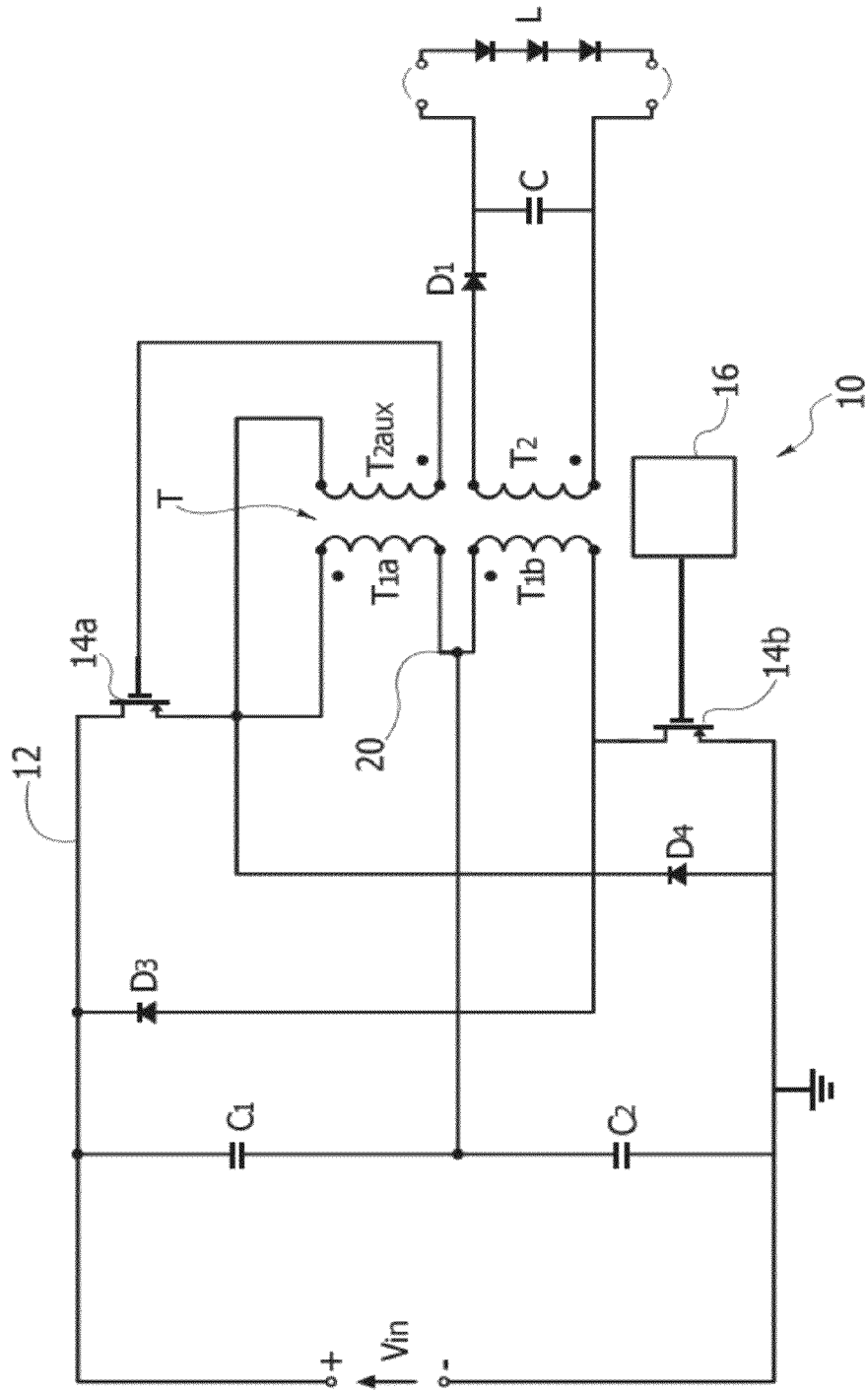
FIG. 2 is a block diagram of an embodiment.

The diagram in FIG. 2 depicts a two-switch flyback converter for electrical supply corresponding, in its basic arrangement, to the general diagram which has been described in connection with FIG. 1.

Therefore, parts, elements and components identical or equivalent to those described with reference to FIG. 1 are denoted in FIG. 2 by the same reference numbers, and this makes it unnecessary to repeat a detailed description of the features and the operation of such elements, parts or components in the following. However, the description of FIG. 1 is incorporated as a description of the embodiment as shown in FIG. 2.

In various embodiments the "high" switch (e.g. a metal oxide semiconductor field effect transistor (mosfet)) 14s is so to say self-driven.

Between input line 12 and ground a capacitive voltage divider is provided comprising two capacitors C1, C2 (which can be assumed as having the same capacitance value, although this is not compulsory), the dividing or intermediate point whereof is connected to an intermediate point, denoted by 20, of primary winding T1 of transformer T. This primary winding T1 can therefore be considered as including a "high" side T1a and a "low" side T1b.

On the side of secondary winding T2 of transformer T there is moreover provided an auxiliary secondary winding T2AUX (generally with a reduced number of turns), one of the ends thereof being connected to the gate of "high" switch 14a, and the opposite end being connected for example to the cathode of diode D4, i.e. to the drain-source line of "low" switch 14b, which in the following will be assumed as driven by a fly-back controller 16 of a known kind, operating according known criteria.

In order to understand the operation of the arrangement in FIG. 2, as a starting point the condition can be assumed in which the "low" switch/mosfet 14b starts conducting, switching from the off state to the on state, the "high" switch/mosfet 14a being off.

The first part of the power is given by the capacitors, because high mosfet 14a is off.

Current therefore starts flowing first from capacitive voltage divider C1, C2 towards T1B (low side of the primary winding), then through mosfet 14b and the supply negative.

At this point all other windings of the transformer are polarized.

In such conditions, e.g. on the secondary windings and e.g. on the auxiliary winding T2AUX, a voltage is present which is proportional to the number of turns and is directed so as to turn "high" switch 14a from off to on.

The voltage across auxiliary winding T2AUX is therefore positive, because of the polarization of the windings (see dots). This voltage can keep the "high" switch 14a conductive.

Current then flows from supply line 12 through switch 14a, subsequently in the windings T1a, T1b of the transformer, then again through 14b to reach the supply negative.

After a certain period with the "low" mosfet 14b conducting, an "off" phase follows, so that the transformer is disconnected from the line and frees energy towards the secondary.

In order to do so, the "low" mosfet 14b is turned off, and the leakage energy stored in the transformer tends to undergo freewheeling towards the diodes arranged on the primary side (i.e. diodes D3, D4). This causes all windings to reverse their polarity, and therefore all the voltages of the windings.

This polarity inversion is sensed by the auxiliary winding $T_{2AUX}$ as well, and has the further effect of urging "high" switch 14a to an off condition.

As a consequence, "high" switch 14a follows 14b, so the high switch performs self driving. Now all the energy stored is transferred towards the secondary winding, through diode D1, in order to feed load L.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A two-switch flyback power supply device, comprising:
   a transformer having a primary winding and a secondary winding to feed a load;
   a pair of electronic switches alternatively switchable on and off to connect the primary winding of said transformer to an input line to feed said primary winding of said transformer, wherein at least one of said electronic switches has a control electrode floating with respect to ground;
   a capacitive voltage divider arranged between said input line and the ground of the two-switch flyback power supply device, with the dividing point of said capacitive voltage divider connected to an intermediate point of said primary winding of said transformer; and
   an auxiliary secondary winding in said transformer, said auxiliary secondary winding feeding the control electrode of said at least one of said electronic switches,
   wherein one of the ends of the auxiliary secondary winding is connected to the gate of the electronic switch having the control electrode floating with respect to ground,
   wherein said at least one of said electronic switches is interposed between said input line and the primary winding of said transformer, and
   wherein the other of said electronic switches is interposed between the primary winding of said transformer and the ground of the circuit.

2. The device of claim 1, wherein a diode is interposed between said input line and said other electronic switch with the cathode of said diode towards said input line.

3. The device of claim 1, further comprising: a further diode interposed between said auxiliary secondary winding and the ground of the device, with the anode of said further diode towards the ground of the device.

4. The device of claim 1, wherein said at least one of said electronic switches is a metal oxide semiconductor field effect transistor.

5. The device of claim 1, wherein said load is a lighting source.

6. The device of claim 5, wherein said lighting source is a light emitting diode lighting source.

\* \* \* \* \*